United States Patent
Koser et al.

(10) Patent No.: US 9,830,608 B2
(45) Date of Patent: Nov. 28, 2017

(54) TECHNIQUES FOR CONTROLLING REDEMPTION OF OFFERS

(75) Inventors: Vincent Robert Koser, West Lafayette, IN (US); Adam John Rausch, Zionsville, IN (US); Jeffrey Scott Jopling, Atlanta, GA (US); Lew Peter Nycz, Kinnelon, NJ (US)

(73) Assignee: NCR Corporation, Duluth, GA (US)

(*) Notice: Subject to any disclaimer, the term of this patent is extended or adjusted under 35 U.S.C. 154(b) by 495 days.

(21) Appl. No.: 13/485,081

(22) Filed: May 31, 2012

(65) Prior Publication Data

US 2013/0325580 A1   Dec. 5, 2013

(51) Int. Cl.
  *G06Q 30/00* (2012.01)
  *G06Q 30/02* (2012.01)

(52) U.S. Cl.
  CPC ............................... *G06Q 30/0207* (2013.01)

(58) Field of Classification Search
  None
  See application file for complete search history.

(56) References Cited

U.S. PATENT DOCUMENTS

| | | | |
|---|---|---|---|
| 2007/0011044 A1* | 1/2007 | Hansen | G06Q 20/24 705/14.15 |
| 2011/0208576 A1* | 8/2011 | Durgin | G06Q 30/02 705/14.38 |
| 2011/0288906 A1* | 11/2011 | Thomas | G06Q 30/02 705/7.29 |
| 2012/0271692 A1* | 10/2012 | Huang | G06Q 30/06 705/14.23 |
| 2012/0284107 A1* | 11/2012 | Gernaat | G06Q 30/0207 705/14.26 |

* cited by examiner

*Primary Examiner* — Matthew T Sittner
(74) *Attorney, Agent, or Firm* — Schwegman, Lundberg & Woessner

(57) ABSTRACT

Techniques for controlling redemption of offers are provided. A checkout process is detected having multiple offers associated with an item or items being purchased. Each offer is evaluated based on custom rules and some, all, or portions of the offers are selectively applied to a retail price for the item to arrive at a final price for the item during the checkout process.

6 Claims, 3 Drawing Sheets

TECHNIQUES FOR CONTROLLING REDEMPTION OF OFFERS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

Consumers can even use their portable digital devices to perform transactions or interact with enterprise kiosks. One such popular approach is to distribute coupons to and redeem coupons from mobile phones. In fact, with public environmental concerns regarding the use of paper products and with the widespread adoption of smart phones and electronic transactions, the use of electronic coupons is becoming increasingly popular with both the consumers and the enterprises providing those electronic coupons.

Coupons are so popular with the buying public that entire social-networking sites and groups have evolved around coupon trading and advice. At one time, manufacturers entertained the idea of reducing the price of goods to eliminate coupons but backtracked based on the widespread popularity of coupon use.

One issue with coupons is that the coupons can be distributed from a wide variety of sources for a single product. For instance, a manufacturer may issue a coupon for a product and a local grocery store may issue its own coupon for the same product. When this situation happens, the actual price of the product can be reduced below zero, such that a consumer receives a credit for taking the product. Applying multiple coupons to a same product is referred to as "coupon stacking."

Obviously, the manufacturer and local stores that sell the products do not desire to pay a consumer to take a product. For that matter, some manufacturers may desire that their product never be sold for below a minimum price regardless of coupons being redeemed.

It seems that everyone has jumped on the coupon bandwagon before technology was able to catch up with the resulting frenzy.

SUMMARY

In various embodiments, techniques for controlling redemption of offers are presented. According to an embodiment, a method for controlling redemption of an offer is provided.

Specifically, multiple offers for an item are received during a checkout process that includes the item. Next, a retail price for the item is acquired and customized rules are applied using the multiple offers and the retail price to arrive at a final price for the item during the checkout process.

DETAILED DESCRIPTION

Figure 1:
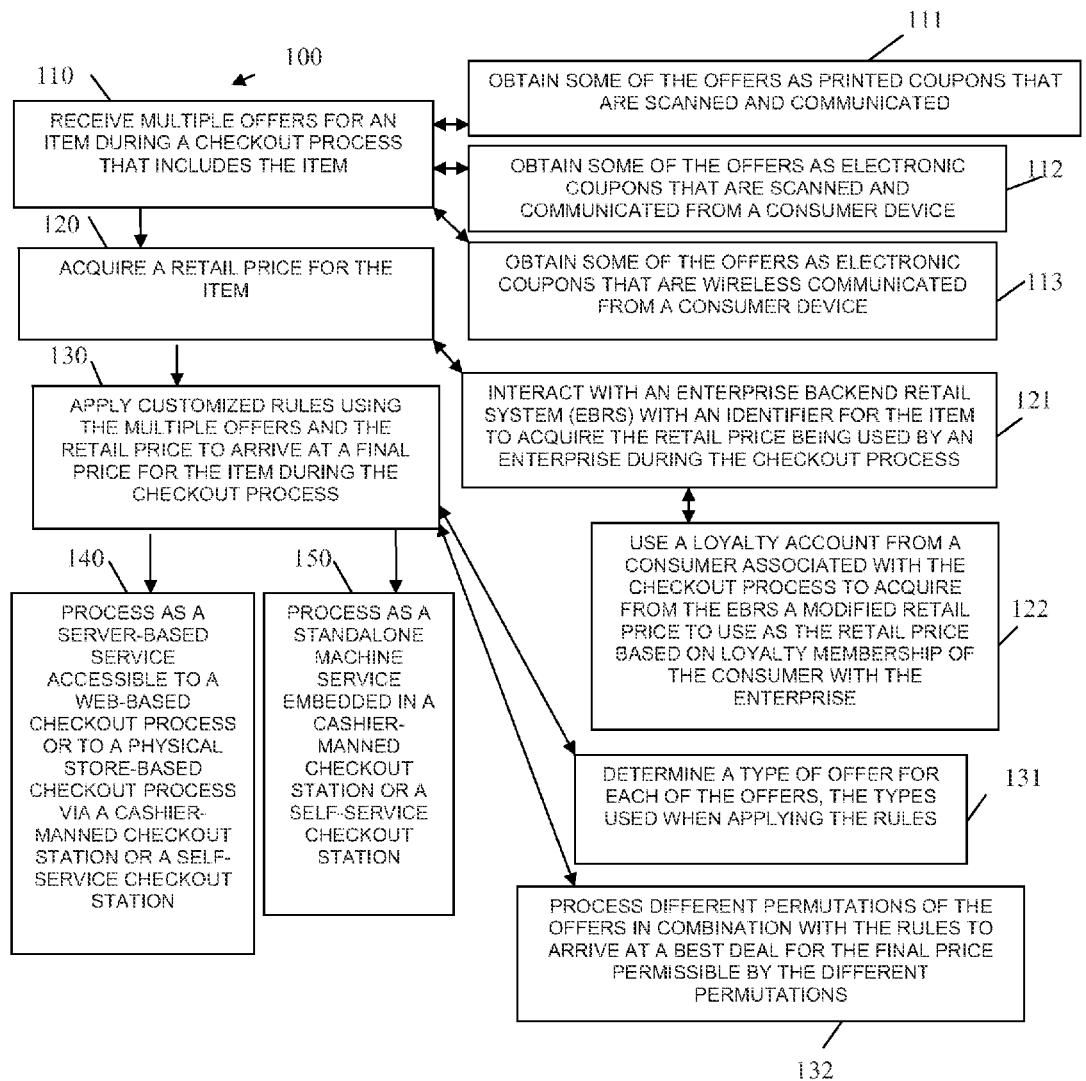
FIG. 1 is a diagram of a method for controlling redemption of an offer, according to an example embodiment.

FIG. 1 is a diagram of a method 100 for controlling redemption of an offer, according to an example embodiment. The method 100 (hereinafter 'offer control manager') is implemented as instructions programmed and residing on a non-transitory computer-readable (processor-readable) storage medium and executed by one or more processors (e.g., checkout machine (self-service or cashier-manned), server, web-based Internet portal, cloud, virtual machine (VM), etc.) over a network connection. The processors are specifically configured and programmed to process the offer control manager. The offer control manager may also operate over a network. The network is wired, wireless, or a combination of wired and wireless.

It is to be noted that although the processing of the offer control manager is described with respect to a single item being purchased, the processing is not so limited. In other words, the processing of the offer control manager can be used for each item in a collection of items being purchased by a consumer during a checkout process.

The item can be for a good or a service. Moreover, as described more completely in the various embodiments below, the purchase can be done via the presence of the consumer at a physical store of via the consumer interacting with a checkout portal for an enterprise over the World-Wide Web (WWW) and the Internet.

At 110, the offer control manager receives multiple offers for an item during a checkout process that includes the item. In an embodiment, the offers are coupons or discounts that are applied to a retail price of the item to reduce its price. In some cases, the coupon provides another and different item for free or reduced price based on the purchase of the item. The actual offer can be received in a variety of manners.

For example, at 111, the offer control manager obtains some of the offers as printed coupons that are scanned and communicated to a machine that the offer control manager processes on. Here, the consumer or a cashier interacting with the consumer during the checkout process scans a barcode or Quick Response (QR) code on a printed coupon using a scanner to communicate the coupon.

In another instance, at 112, the offer control manager obtains some of the offers as electronic coupons that are scanned directly from a display of a consumer's portable device (such as phone or tablet), the results of the scan are then communicated to the machine that processes the offer control manager.

It should also be noted that communication of the identifiers for the coupons can be made to a device associated with the checkout process and transmitted remotely over a network to the offer control manager when the offer control manager is a server-based implementation (discussed below).

In yet another situation, at 113, the offer control manager obtains some of the offers as electronic coupons that are wirelessly communicated from a consumer's device to the machine processing the offer control manager. Wireless communication can be achieved via a variety of techniques, such as Bluetooth, Wi-Fi, Near Field Communication (NFC), and others.

Moreover, the processing of 111-113 is not mutually exclusive; that is, the processing of 111-113 can be done during a single checkout process for the item where some coupons are each communicated to the offer control manager using a different approach or some combination of the approaches.

At 120, the offer control manager acquires a retail price for the item. The retail price can be obtained in a variety of manners as well. In some cases, the checkout station communicates the price to the offer control manager, in other cases; the offer control manager directly obtains the retail price on its own.

For example, at 121, the offer control manager interacts with an enterprise backend retail system with an identifier from the item to acquire the retail price being used by an enterprise during the checkout process.

Continuing with the embodiment of 121 and at 122, the offer control manager uses a loyalty account for a consumer associated with the checkout process to acquire from the enterprise backend retail system a modified retail price to use as the retail price based on a loyalty membership of the consumer with the enterprise. Here, the retail price may be tiered such that it is different for non-members of an enterprise loyalty program. Moreover, in some cases, the retail price may be different based on a certain level within the loyalty program for a given member (e.g., gold versus silver members, etc.).

At 130, the offer control manager applies customized rules using the multiple offers and the retail price to arrive at a final price for the item during the checkout process. The customized rules can be based on the item, a manufacturer of the item, an enterprise selling the item during the checkout process, and/or an entity distributing the offer when different from the manufacturer. A variety of customized rules can be used that include conditions which are dynamically evaluated during the checkout process based on the retail price, the item, the offers, and conditions defined in the offers.

According to an embodiment, at 131, the offer control manager determines a type of offer for each of the multiple offers. The types are also used when applying the rules. Some types include: who is distributing a particular coupon, redemption value (buy one get one free, etc.), exclusive offer (cannot be used with any other offer), and the like.

In an embodiment, at 132, the offer control manager processes different permutations of the offers in combination with the rules to arrive at a best deal for the final price, which is permissible by the different permutations. For instance, if one offer in the offers is excluded, then based on the rules the final price is lower than what it would be if that one offer was included with the rules. Multiple computations are processed and the resulting final prices compared against one another to determine a best or optimal final price for the consumer.

In another situation, at 133, the offer control manager overrides the final price when the final price goes negative (below zero or results in money being credited to the consumer). In fact, the override can occur when the final price falls below any predefined threshold value, such that the final price is assigned to the predefined threshold value. This situation can occur when the manufacturer demands that the price for the item never fall below a certain minimum price or below zero.

According to an embodiment, at 140, the offer control manager processes as a server-based or cloud-based service accessible to a web-based checkout process or to a physical store-based checkout process via a cashier-manned checkout station or a self-service checkout station (kiosk or Automated Teller Machine (ATM)).

In an alternative approach, at 150, the offer control manager is processed as a standalone machine service embedded in a cashier-manned checkout station or a self-service checkout station.

Again, it is noted that the rules can be customized to include a variety of conditions. By way of example only, some conditions may state: manufacturer funded coupons cannot be combined or stacked with a single item during checkout; manufacturer coupons can flex to prevent a final price from going negative or below zero (being free); other coupons not issued from the manufacturer may apply on top of the manufacturer coupons if appropriately configured; other coupons may not be stacked when a "best deal" approach is used as discussed above with the embodiment of 132, and/or other configured situations represented as conditions in the customized rules.

Figure 2:
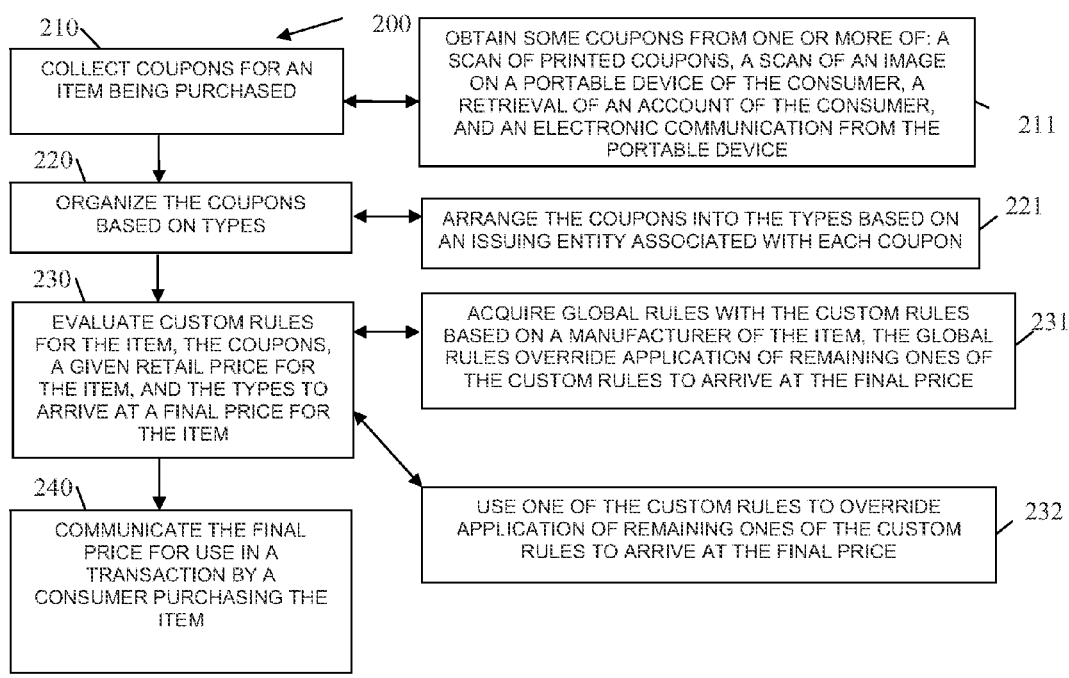
FIG. 2 is a diagram of another method for controlling redemption of an offer, according to an example embodiment.

FIG. 2 is a diagram of another method 200 for controlling redemption of an offer, according to an example embodiment. The method 200 (hereinafter "offer redemption manager") is implemented as instruction and programmed within a non-transitory computer-readable (processor-readable) storage medium that executes on one or more processors of a network-based machine or stand-alone machine; the processors of the machine are specifically configured to execute the offer redemption manager. The offer redemption manager may also be operational over a network; the network is wired, wireless, or a combination of wired and wireless.

The processing of the offer redemption manager reflects enhanced and different aspects of the offer control manager represented by the method 100 of the FIG. 1.

At 210, the offer redemption manager collects coupons for an item being purchased. Again, initial identification of consumer-presented coupons with the purchase of an item during a checkout transaction can occur in a variety of manners.

For example, at 211, the offer redemption manager obtains some of the coupons from one or more of: a scan or printed coupons, a scan of an image presented on a display of a portable device of the consumer, a retrieval of an account of the consumer (electronically stored coupons based on rewards, etc. and associated with an account of the consumer), and/or an electronic communication from the portable device (Bluetooth, Wi-Fi, NFC, etc.).

At 220, the offer redemption manager organizes the coupons based on types. A variety of types can be used as discussed above with reference to the discussion of the FIG. 1.

For example, at 221, the offer redemption manager arranges the coupons into types based on an issuing entity associated with each coupon (manufacturer, store, distributor, etc.).

At 230, the offer redemption manager evaluates custom rules for the item, the coupons, a given retail price for the item, and the types to arrive at a final price for the item.

According to an embodiment, at 231, the offer redemption manager also acquires global rules with the custom rules based on a manufacturer of the item. The global rules override the custom rules. This ensures that the manufacturer can exercise control over the final price for its item. It is noted that the store redeeming the coupons can also have its own global rules that can be used to override the coupons. In fact, multiple hierarchical layers of rules can be applied when evaluating the custom rules.

In another case, at 232, the offer redemption manager uses one of the custom rules to override application of remaining ones of the custom rules to arrive at the final price. This may be a "best deal" situation as discussed above with reference to the discussion of the FIG. 1. So, when some coupons cannot be applied with other coupons in the collected list of coupons a customized rule may override and state find a best price for the final price of the item by using different combinations of the available coupons.

Figure 3:
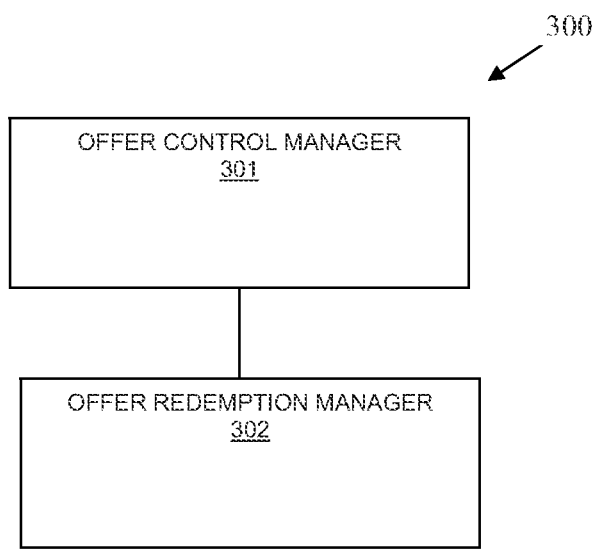
FIG. 3 is a diagram of an offer redemption control system, according to an example embodiment.

FIG. 3 is a diagram of an offer redemption control system 300, according to an example embodiment. The components of the offer redemption control system 300 are implemented as executable instructions and programmed within a non-transitory computer-readable (processor-readable) storage medium that execute on one or more processors of a network-based server (cloud, proxy, Virtual Machine (VM), etc.) or a standalone machine (cashier-manned checkout station, self-service checkout station, kiosk, etc.); the processors are specifically configured to execute the components of the offer redemption control system 300. The offer redemption control system 300 may also be operational over a network; the network is wired, wireless, or a combination of wired and wireless.

The offer redemption control system 300 includes an offer control manager 301 and an offer redemption manager 302. Each of these components and the interactions of each component are now discussed in turn.

The offer redemption control system 300 includes a one or more network-based or standalone machine processors accessible, which can be accessible over a network connection. The one or more processors include execution instructions for the offer control manager 301, which resides and is programmed within a non-transitory computer-readable storage medium and processed on the one or more processors. Example processing associated with the offer control manager 301 was presented in detail above with reference to the FIG. 1.

The offer control manager 301 is configured to collect and organize offers during a checkout transaction with a consumer. The offers are for an item associated with the checkout transaction. Again, it is noted that there may be multiple items being purchased in the checkout transaction and for each item in the checkout transaction having multiple offers, the processing of the offer control manager 301 is invoke as is the processing of the offer control redemption manager 302.

The offer redemption control system 300 also includes a one or more network-based or standalone machine processors, which may also be accessible over a network connection. The one or more processors include execution instructions for the offer redemption manager 302, which resides and is programmed within a non-transitory computer-readable storage medium and processed on the one or more processors. Example processing associated with the offer redemption manager 302 was presented in detail above with reference to the FIG. 2.

The offer redemption manager 302 is configured to use the organized offers and a retail price provided by the offer control manager 301 to apply custom rules and computer a final price for the item during the checkout transaction.

According to an embodiment, the offer redemption manager 302 is further configured to apply global rules that override an intermediate final price produced by the custom rules when the intermediate price falls below a predefined threshold (such as but not limited to zero).

In another situation, the offer redemption manager 302 is also configured to evaluate different permutations of the offers in connection with the custom rules to produce an optimal value for the final price. "Optimal" refers to a lowest available final price for the item based on the existing custom rules and set of coupons presented by the consumer during the checkout transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method for managing consumer coupon stacking for an item during a checkout process at a checkout station, the method programmed in a non-transitory processor-readable medium and to execute on one or more processors of the checkout station configured to execute the method, comprising:
   (a) receiving, by the checkout station, multiple offers for the item during the checkout process that includes the item, wherein receiving further includes obtaining: 1) some of the offers as electronic coupons that are scanned from a consumer's device and communicated to the checkout station, 2) some of the offers as electronic coupons that are wirelessly communicated from a consumer's device to the checkout station, 3) some of the offers by retrieval of stored coupons from a consumer's account;
   (b) acquiring, by the checkout station, a retail price for the item;
   (c) determining, by the checkout station, an optimal value for the item that is associated with the multiple offers, and wherein:
     determining further includes processing customized rules for determining the optimal value, wherein the optimal value is a lowest available and a final price for the item, and
     each offer is one of:
       a coupon that reduces the retail price,
       a discount that reduces the retail prices,
       a different free item provided when the item is purchased, and
       a reduced price for a different item provided when the item is purchased,
     each offer includes conditions for redemption that can one of:
       restrict certain combinations of the multiple offers being applied together to reduce the retail price and prohibit redemption of a particular offer when a reduced retail price falls below a predefined amount, the conditions of the multiple offers when combined with one another for determining the optimal value represent some of the customized rules, and other ones of customized rules represent conditions that indicate one or more of:
1) that multiple ones of the multiple offers from a particular manufacture for the item cannot be combined during the checkout process,
2) that multiple ones of the multiple offers from the particular manufacture for the item can flex when applied to the item during the checkout process for preventing the final price from falling below zero,
3) that some of the multiple offers that are not from the particular manufacturer may be applied to the item during the checkout process in addition to any other of the multiple offers provided by the particular manufacturer for the item, and
4) that any particular ones of the multiple offers cannot be stacked and applied to the item when a computed best deal for the item is made during the checkout process, at least one customized rule includes an override condition that overrides the custom rules and that ensures that the final price for the item is controlled by the particular manufacturer through enforcement of the global rule, and determining further includes processing different permutations of the multiple offers in separate combinations with the rules to arrive at the final price representing the optimal value that is permissible from the different permutations for the item; and (d) iterating, by the checkout station, (a)-(c) for a next item in a collection of items being purchased by the consumer during the checkout process.

2. The method of claim 1, wherein receiving further includes obtaining some of the offers as printed coupons that are scanned and communicated to the checkout station.

3. The method of claim 1, wherein acquiring further includes interacting with an enterprise backend retail system with an identifier for the item to acquire the retail price being used by an enterprise during the checkout process.

4. The method of claim 3, wherein interacting further includes using a loyalty account for a consumer associated with the checkout process to acquire from the enterprise backend retail system a modified retail price to use as the retail price based on a loyalty membership of the consumer with the enterprise.

5. The method of claim 1, wherein applying further includes determining a type of offer for each of the multiple offers, the types used when processing the customized rules.

6. The method of claim 1, wherein applying further includes evaluating other items with conditions of some of the offers for the item when applying the rules to ensure the other items are part of the checkout process.

* * * * *